May 9, 1967
A. W. GAUBATZ
3,318,532
GAS INJECTION THRUST VECTOR CONTROL SYSTEM FOR
ROCKET ENGINES
Filed April 29, 1964
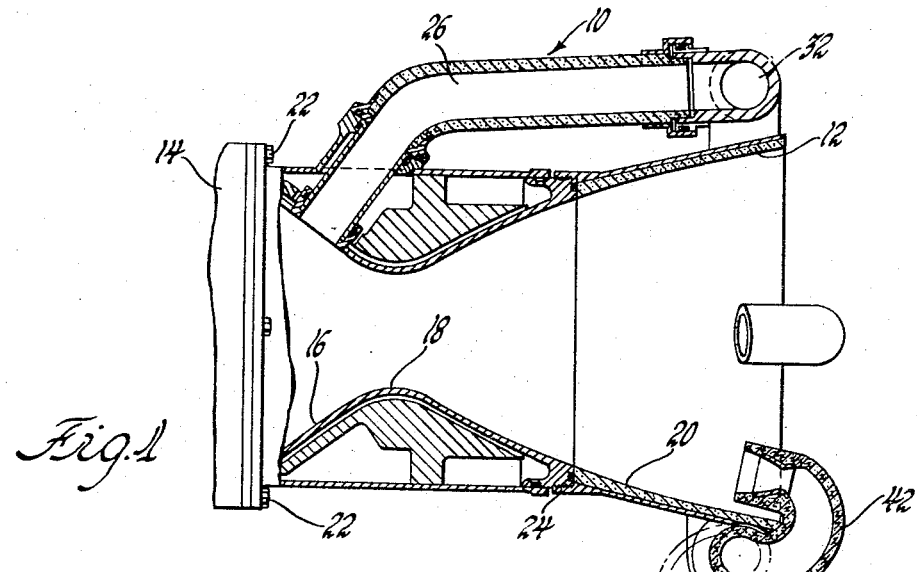
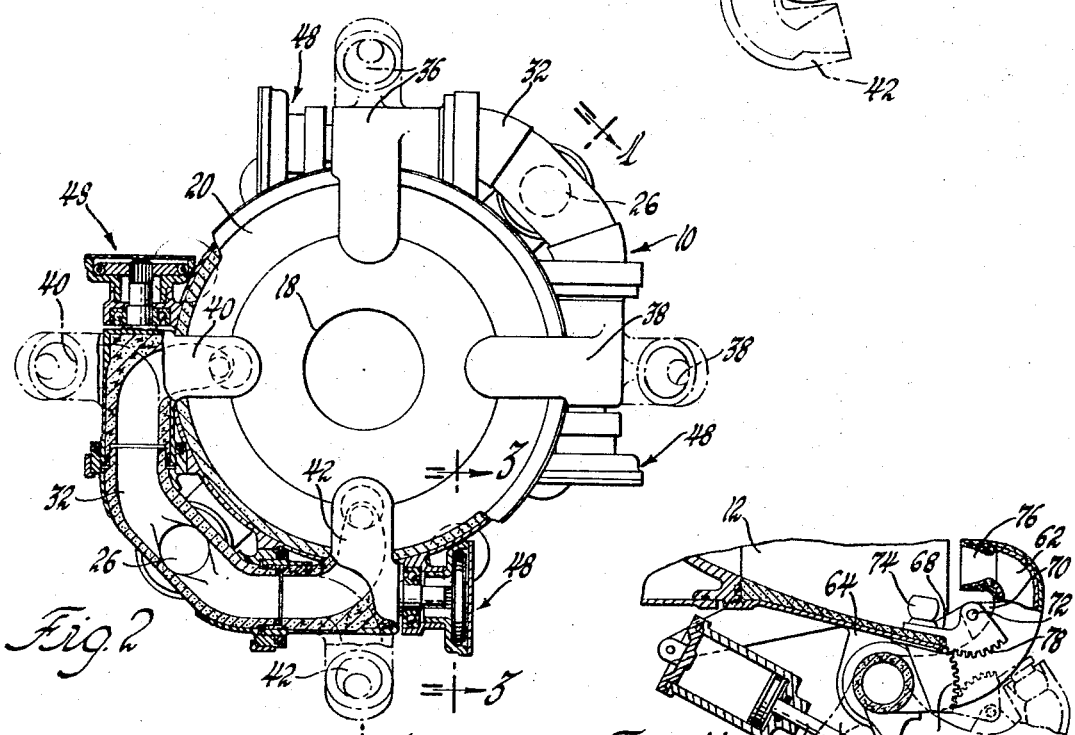
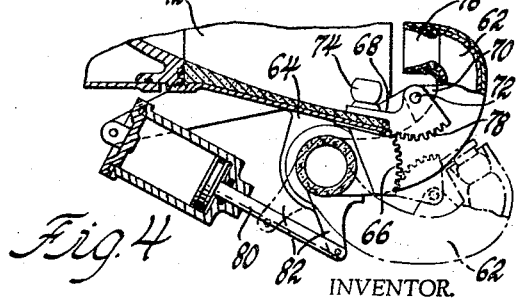
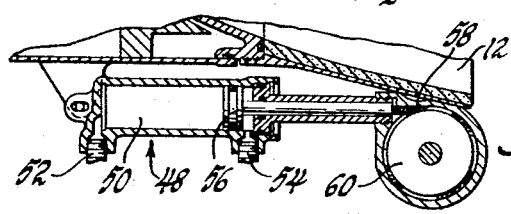
INVENTOR.
Arthur W. Gaubatz
BY
Paul Fitzpatrick
ATTORNEY

United States Patent Office 3,318,532
Patented May 9, 1967

3,318,532
GAS INJECTION THRUST VECTOR CONTROL
SYSTEM FOR ROCKET ENGINES
Arthur W. Gaubatz, Indianapolis, Ind., assignor to General Motors Corporation, Detroit, Mich., a corporation of Delaware
Filed Apr. 29, 1964, Ser. No. 363,356
6 Claims. (Cl. 239—265.23)

This invention relates to rocket engines and more particularly to a secondary gas injection thrust vector control system for rocket engines.

A standard method of providing control and stability for rocket-boosted or rocket-sustained vehicles is the use of large fixed fins or movable nozzles. During the past several years various methods have been proposed to provide control and stability by deflection of the rocket exhaust, thereby reducing or eliminating the requirement of these large booster fins. The control forces which can be developed in a jet deflected by internal vanes, paddle vanes, or by a swiveling nozzle have been demonstrated by actual tests to be of sufficient magnitude for control purposes. However, these systems require complex and bulky servo systems to provide sufficient actuating torques and, in the case of jet vanes or paddle vanes, materials which are not susceptible to erosion must be utilized. It can be seen that there is a strong need for a thrust vector control system in a rocket engine which is relatively simple and light in weight and yet effective in operation thereby avoiding the disadvantages of the previously discussed known methods.

It is therefore the object of this invention to provide a relatively simple system to provide stability and control for a rocket engine, and which avoids the disadvantages of prior such devices.

It is another object of this invention to provide a thrust vector control system for a rocket engine which uses secondary gas injection.

It is a further object of the subject invention to provide a secondary gas injection thrust vector control system for a rocket engine which is able to inject a secondary gas stream into the main exhaust stream over a wide range of angles.

Other objects, features and advantages of the subject invention will become apparent upon reference to the following detailed description and the drawings showing the preferred embodiments thereof, wherein:

FIGURE 1 is a sectional view of the rocket engine nozzle and a portion of the secondary gas injection system as taken in the direction of arrows 1—1 in FIGURE 2;

FIGURE 2 is an end view looking into the rocket engine nozzle from the downstream or exit end and showing the secondary gas injection system in detail;

FIGURE 3 is a sectional view of the actuating means for the secondary gas injection system as taken in the direction of arrows 3—3 in FIGURE 2; and FIGURE 4 is a sectional view showing an alternate embodiment of the subject invention wherein a plug means is provided to block the flow of secondary gas when the injector nozzles are removed from the main exhaust stream.

Although the subject invention has been illustrated in its preferred embodiments it is not to be so limited and it should be understood that it would have many other applications and uses.

In general, the subject invention relates to a secondary gas injection system 10 as applied to the nozzle 12 of a rocket engine 14. The specific details of the rocket engine 14 will not be discussed as they are not felt to be pertinent to the subject invention. Suffice it to say, however, that the rocket engine 14 will be of a type wherein combustion of propellants occurs in a combustion chamber and the combustion products expand through a nozzle thereby producing a thrust on the vehicle. The nozzle 12 is a converging-diverging type with a converging entrance portion 16, a throat or venturi portion 18, and a diverging exit portion 20. The exhaust nozzle 12 may be of any suitable type and may be fastened to the rocket engine 14 by means of bolts 22. The exit portion 20 may be fastened to the main portion of the nozzle by any suitable means such as the threaded engagement shown at 24. It is to be assumed that the exhaust nozzle 12 will be lined by an adequate heat resistant material for the required operating conditions.

The remainder of the discussion will be directed to the secondary gas injection system and its relation to the exhaust nozzle 12. A pair of bleed gas conduits 26 are provided and open into the upstream portion of the exhaust nozzle 12. A small portion of the exhaust gas stream passing through the nozzle 12 will be bled from it into the bleed gas conduits 26. The conduits 26, as seen in FIGURE 2, lead to a pair of gas manifolds 32, respectively. Each of the gas manifolds 32 connects the gas conduits 26 to a pair of thrust vector control nozzles. One of the gas mainfolds 32 leads to the thrust vector control nozzles 36 and 38 and the other leads to the thrust vector control nozzles 40 and 42. The embodiment shown in FIGURES 1, 2 and 3 features the use of four such thrust vector control nozzles, and it should be clear that any number of such nozzles may be used, with a minimum of three needed for complete directional control.

As seen in FIGURE 1, the continuously flowing thrust vector control nozzle 42 can swing from a counterstream position shown in solid lines to a non-vectoring position shown in dashed lines completely out of the main exhaust stream. It should be noted that the position of the nozzle 42 can be varied between these two extreme positions, and that varying degrees of main nozzle thrust deflection can be obtained. When in the extreme non-vectoring position, the thrust of the control nozzles adds completely to the thrust of the main nozzle 12. The actuating means for the control nozzle 42 is shown in detail in FIGURE 3. An actuator 48 is provided and is a hydraulically powered pushpull cable arrangement. The actuating means includes a cylinder 50 with oil inlets 52 and 54 opening on both sides of a piston 56. The piston 56 is connected by a cable 58 to a rotatable wheel 60 which pivots the injection nozzle 42. The cable is a well known type having a helically wrapped outer wire which engages tooth spaces in wheel 60 to obtain a positive drive in both directions. Thus, when the oil is forced thru opening 52 and out opening 54, piston 56 takes the position shown in FIGURE 3, and cable 58 will wind around the wheel 60 as the injection nozzle 42 rotates out of the gas stream to the position shown in dashed lines in FIGURE 1. In constrast to this, when the oil is forced to flow through inlet 54 and out the opening 52, the piston 56 will move toward the left end of the chamber 50 thereby unwinding a portion of the cable 58 from the wheel 60 and rotating the injection nozzle 42 toward the extreme position shown in solid lines in FIGURE 1. Hence, it can be seen that by varying the flow into the cylinder 50 through the inlets 52 and 54, the piston 56 can move to a variety of positions thereby moving the injection nozzle 42 to a wide range of positions. It should be clear that each of the injection nozzles has its own actuation means such as the one illustrated in FIGURE 3 so that each injection nozzle may be moved individually or in combination, thereby producing the complete range of thrust vector control desired. For example, tests have shown that when an injection nozzle is injecting perpendicular to the main stream the amount of vectoring is one-third of the maximum vectoring which occurs when the injection nozzle is in the counterstream position. Thus pitch and yaw control can be obtained merely by operating the desired injection nozzle of the desired angle.

The embodiment shown in FIGURE 4 provides an intermittent injection system for attaining thrust vector control rather than a continuous injection system as is shown in the embodiment of FIGURES 1, 2 and 3. In short, the FIGURE 4 arrangement includes a valve or plug means to interrupt the flow through the injection nozzle such that the nozzle produces thrust vector control only when it is in its fully inserted position. In the remainder of the positions, the plug is either partially blocking the injection nozzle, or completely blocking it, as in the case when the injection nozzle is moved out of the exhaust stream. More specifically, a rotatable nozzle 62 is mounted to a flange 64 which is fixed to the gas manifold 32 surrounding the sozzle 12. A gear sector 66 is fixed to the nozzle 12 and located adjacent the outer edge of the diverging end of the nozzle 12. A plug means 68 is rotatably pinned to a flange 70 on the injection nozzle 62 by means of a pin 72. The plug means 68 has a head 74 which fits into and plugs the diverging end 76 of the injection nozzle 62. On the other side of the plug means 68 is a gear sector 78 which is constructed to mesh with the gear sector 66. Thus, as the injection nozzle 62 rotates, the gear sector 78 meshes with the gear sector 66 and the plug means 68 rotates at a different rate than the injection nozzle 62. The result of this is shown in dashed lines in FIGURE 4 where it is seen that the plug head means 74 rotates into the diverging exit portion 76 of the injection nozzle 62 thereby blocking the injection flow through the nozzle 62. The actuation means for the FIGURE 4 embodiment is similar to that shown in FIGURE 3 except that a solid connecting rod 80 connects with a lever arm 82 fixed to nozzle 62 to thereby move the nozzle 62. It is therefore seen that the amount of rotation attainable by the nozzle 62 will be much less than that of the nozzle 42 in the first embodiment.

The embodiment shown in FIGURE 4 is suggested merely as an alternative to the embodiment shown in FIGURES 1, 2 and 3 for situations where either no injection or full counterstream injection is required and its inherent advantage for this particular situation is to eliminate the injection gas losses which result when the injection nozzle is in the non-vectoring position and to reduce the possibility of erosion of the main nozzle structure due to the errant flow of injection gas against it. It should also be clear that, although FIGURE 4 has been illustrated with the use of gear sectors to rotate the plug 68, many other mechanical means could be adapted to provide the same result.

Thus, it shoulld be clear from the preceding discussion that the subject invention provides a relatively simple, and yet effective method of attaining complete thrust vector control and that it overcomes the disadvantages associated with prior such systems.

Although the invention has been described with respect to its preferred embodiments, it should be clear to those skilled in the art to which the invention pertains that many modifications and changes may be made thereto without departing from the scope of the invention.

I claim:

1. A secondary gas injection thrust vector control system adapted to be used in conjunction with a rocket engine having an exhaust nozzle for an exhaust gas stream passing through said exhaust nozzle, said system comprising:
    a plurality of thrust vector control nozzles swingably mounted to the downstream end of said exhaust nozzle such that they are adapted to move in and out of said exhaust gas stream said control nozzles being in constant open communication;
    constantly open means to bleed gases from said exhaust stream at an upstream location and conduct the bleed gases constantly to said thrust vector control nozzles during operation of said engine for injection into said exhaust stream;
    and actuating means to control the position of said thrust vector control nozzles and determine the angle of injection through a range of opposite, transverse, and rearward angles of said bleed gases into said exhaust stream thereby vectoring the resultant thrust produced by said rocket engine.

2. A secondary gas injection thrust vector control system adapted to be used in conjunction with a rocket engine having an exhaust nozzle for an exhaust gas stream passing through said exhaust nozzle, said system comprising:
    a plurality of thrust vector control nozzles swingably mounted to the downstream end of said exhaust nozzle such that they are adapted to move in and out of said exhaust gas stream, said control nozzles being in constant open communication;
    constantly open gas bleed conduits having an opening into said exhaust nozzle to bleed gases constantly from said exhaust gas stream passing through said exhaust nozzle;
    gas manifolds extending around the circumference of said exhaust nozzle at its downstream end, said gas manifolds providing a constantly open gas conducting connection between said gas bleed conduits and said thrust vector control nozzles so that the bleed gases constantly pass from said gas bleed conduits to said control nozzles during operation of said engine for injection into the exhaust gas stream at the downstream end of said exhaust nozzle;
    and actuating means to control the position of said thrust vector control nozzles and determine the angle of injection through a range of opposite, transverse, and rearward angles of said bleed gases into said exhaust stream thereby vectoring the resultant thrust produced by said rocket engine.

3. A secondary gas injection thrust vector control system adapted to be used in conjunction with a rocket engine having an exhaust nozzle and an exhaust gas stream passing through said exhaust nozzle, said system comprising:
    a plurality of thrust vector control nozzles swingably mounted to the downstream end of said exhaust nozzle such that they are adapted to move in and out of said exhaust gas stream said control nozzles being in constant open communication;
    constantly open gas bleed conduits having an opening into said exhaust nozzle to constantly bleed gases from said exhaust gas stream passing through said exhaust nozzle;
    gas manifolds extending around the circumference of said exhaust nozzle at its downstream end, said gas manifolds providing a constantly open gas conducting connection between said gas bleed conduits and said thrust vector control nozzles so that the bleed gases constantly pass from said gas bleed conduits to said control nozzles during operation of said engine for injection into the exhaust gas stream at the downstream end of said exhaust nozzle;
    and individual hydraulic actuating means to control the position of each of said thrust vector control nozzles and determine the angle of injection through a range of opposite, transverse, and rearward angles of said bleed gases into said exhaust stream thereby vectoring the resultant thrust produced by said rocket engine.

4. A secondary gas injection thrust vector control system adapted to be used in conjunction with a rocket engine having an exhaust nozzle and an exhaust gas stream passing therethrough, said system comprising:
    a plurality of thrust vector control nozzles swingably mounted to the downstream end of said exhaust nozzle such that they are adapted to move in and out of said exhaust gas stream;

means to bleed gases from said exhaust stream at an upstream location and conduct the bleed gases to said thrust vector control nozzles for injection into said exhaust stream;

actuating means to control the position of said thrust vector control nozzles and determine the angle of injection of said bleed gases into said exhaust stream thereby vectoring the resultant thrust produced by said rocket engine;

and movable plug means for each of said injection nozzles adapted to move at a different rate than said thrust vector control nozzles such that when a control nozzle is positioned in said exhaust gas stream its corresponding plug rotates out of the injection gas flow and when said control nozzle is positioned out of said exhaust gas stream its corresponding plug rotates into the exit of said control nozzle to block the flow of injection gases from said control nozzle.

5. A secondary gas injection thrust vector control system adapted to be used in conjunction with a rocket engine having an exhaust nozzle and an exhaust gas stream passing therethrough, said system comprising:

a plurality of thrust vector control nozzles swingably mounted to the downstream end of said exhaust nozzle such that they are adapted to move in and out of said exhaust gas stream;

gas bleed conduits having an opening into said exhaust nozzle to bleed gases from said exhaust gas stream passing through said exhaust nozzle;

gas manifolds extending around the circumference of said exhaust nozzle at its downstream end, said gas manifolds providing a gas conducting connection between said gas conduits and said thrust vector control nozzles so that the bleed gases pass from said gas bleed conduits to said control nozzles for injection into the exhaust gas stream at the downstream end of said exhaust nozzle;

actuating means to control the position of said thrust vector control nozzles and determine the angle of injection of said bleed gases into said exhaust stream thereby vectoring the resultant thrust produced by said rocket engine;

and movable plug means for each of said thrust vector control nozzles adapted to move at a different rate than said control nozzles such that when a control nozzle is positioned in said exhaust gas stream its corresponding plug rotates out of the injection gas flow and when said control nozzle is positioned out of said exhaust gas stream its corresponding plug rotates into the exit of said control nozzle to block the flow of injection gases from said control nozzle.

6. A secondary gas injection thrust vector control system adapted to be used in conjunction with a rocket engine having an exhaust nozzle and an exhaust gas stream passing therethrough, said system comprising:

a plurality of thrust vector control nozzles swingably mounted to the downstream end of said exhaust nozzle such that they are adapted to move in and out of said exhaust gas stream;

gas bleed conduits having an opening into said exhaust nozzle to bleed gases from said exhaust gas stream passing through said exhaust nozzle;

gas manifolds extending around the circumference of said exhaust nozzle at its downstream end, said gas manifolds providing a gas conducting connection between said gas bleed conduits and said thrust vector control nozzles so that the bleed gases pass from said gas gleed conduits to said control nozzles for injection into the exhaust gas stream at the downstream end of said exhaust nozzle;

individual hydraulic actuating means to control the position of each of said thrust vector control nozzles and determine the angle of injection of said bleed gases into said exhaust stream thereby vectoring the resultant thrust produced by said rocket engine;

and movable plug means for each of said thrust vector control nozzles adapted to move at a different rate than said control nozzles such that when a control nozzle is positioned in said exhaust gas stream its corresponding plug rotates out of the injection gas flow and when said control nozzle is positioned out of said exhaust gas stream its corresponding plug rotates into the exit of said control nozzle to block the flow of injection gases from said control nozzle, said plug means having a gear sector portion which meshes with a fixed gear sector on said gas manifolds to provide the rotational path of said plug means.

References Cited by the Examiner

UNITED STATES PATENTS

| | | | |
|---|---|---|---|
| 3,016,699 | 1/1962 | Bertin et al. | 60—35.54 |
| 3,020,714 | 2/1962 | Eggers et al. | 60—35.54 |
| 3,116,603 | 1/1964 | Hausmann | 60—35.54 |
| 3,132,478 | 5/1964 | Thielman | 60—35.54 |
| 3,144,752 | 8/1964 | Kepler | 60—35.54 |

FOREIGN PATENTS 64,773 6/1955 France.

MARK NEWMAN, *Primary Examiner.*

A. L. SMITH, *Assistant Examiner.*